UNITED STATES PATENT OFFICE.

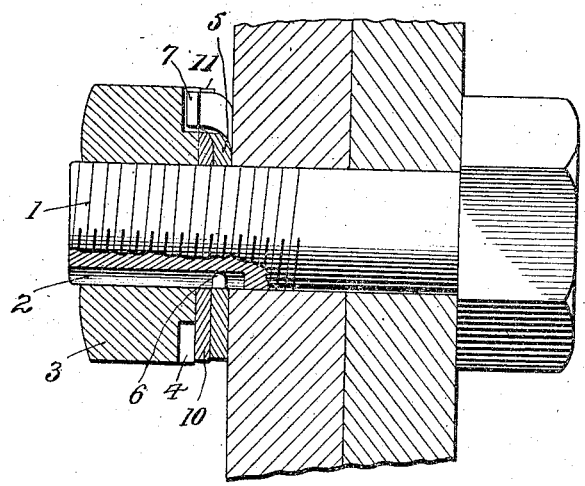
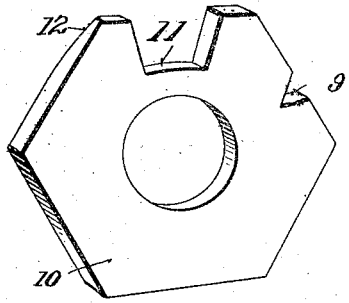
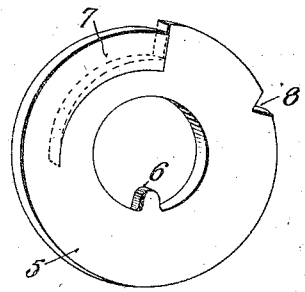
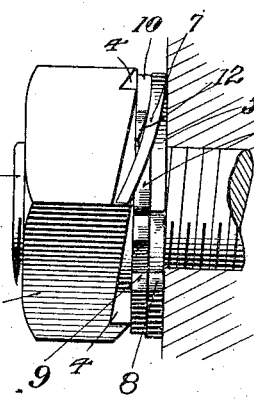
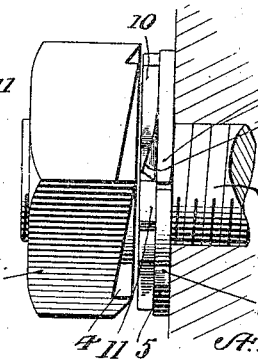

ANTON NORDLUND, OF WARROAD, MINNESOTA.

NUT-LOCK.

No. 929,322.                Specification of Letters Patent.        Patented July 27, 1909.

Application filed July 3, 1908. Serial No. 441,804.

*To all whom it may concern:*

Be it known that I, ANTON NORDLUND, a citizen of the United States, residing at Warroad, in the county of Roseau and State of Minnesota, have invented certain new and useful Improvements in Nut-Locks, of which the following is a specification.

The present invention belongs to means for preventing the loosening of nuts upon bolts and like parts after the same have been tightened.

In the provision of securing means of the nature aforesaid, it is common to interpose a lock washer between the nut and the part secured thereby, said lock washer having a spring tongue to engage with a tooth or like part of the nut and secured against rotation, thereby preventing the loosening of the fastening. Considerable difficulty has been encountered to remove the nut when secured by fastening means as generally provided, hence either the nut or the lock devices are either destroyed or mutilated to such an extent as to prevent their reuse.

The present invention interposes between the nut and the lock washer a release washer, the same having an opening for the tongue of the lock washer to project through, and said release washer being movable to depress the tongue of the lock washer so as to prevent its engagement with the tooth or engaging part of the nut.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a central longitudinal section of a bolt provided with lock means embodying the invention. Fig. 2 is a detail view of the lock washer. Fig. 3 is a detail view of the release washer. Fig. 4 is a side view of the nut lock, showing the spring tongue in engagement with the nut. Fig. 5 is a view similar to Fig. 4, showing the tongue depressed or held out of engagement with the nut.

Corresponding and like parts are referred to in the following description and indicated in all the views of the drawings by the same reference characters.

The part 1 may be a bolt, rod or like fastening having a portion threaded, having a longitudinal groove 2 intersecting the threads. The nut 3 has its opening provided with screw threads to match the threaded portion of the bolt or fastening 1 and has a series of teeth 4 upon its inner face so as to make interlocking engagement with the spring tongue of the lock washer.

The lock washer 5 is adapted to slip upon the bolt or part 1 and is held against rotation thereon. To effect the latter result, a teat 6 extends inward from the inner edge of the washer and is adapted to enter the longitudinal groove 2 of the bolt 1. A tongue 7 is partly cut from the washer 5 and is pressed to one side thereof at its free end so as to engage with the teeth 4 of the nut and prevent backward rotation of the latter. A spring tongue 7 is provided at the outer edge of the lock washer and curves in its length and is sufficiently stout to effect the desired result. A notch 8 is formed in an edge of the lock washer and is adapted to register with a corresponding notch 9 in the edge of the release washer to indicate the proper position of the latter. The notches 8 and 9 are also adapted to receive the edge of a suitable tool to prevent rotation of the release washer when it is required to hold the same stationary.

The release washer 10 is adapted to slip loosely upon the threaded portion of the bolt or part 1 and is arranged between the lock washer and the nut. An opening 11 is provided in an edge portion of the release washer to receive the free end portion of the lock tongue 7. A portion of the release washer at one side of the opening 11 is reduced in thickness to provide ample clearance for the spring lock tongue 7. The reduced part is indicated at 12 and tapers toward the opening, the taper vanishing some distance from the opening 11.

When the parts are assembled, the lock washer 5 is slipped upon the bolt 1 after which the release washer 10 is placed upon the bolt over the lock washer, and the nut is next placed in position and screwed home upon the bolt. The release washer is so positioned as to admit of the free end of the spring tongue 7 extending through the opening 11 therein so as to engage with the teeth 4 of the nut and lock the latter against backward rotation when properly tightened. When it is required to remove the nut, the release washer is turned so as to throw the opening 11 out of registry with the free end of the lock tongue 7, and this may be accomplished by turning the washer 10 forward either with the nut or independently thereof, as may be found most convenient. When the release washer is turned forward, the beveled or tapered portion 12 rides upon the free end of the lock tongue 7 and depresses the same or moves it out of engagement with the teeth of the nut, as shown most clearly in Fig. 5.

Having thus described the invention, what is claimed as new is:

As an article of manufacture a nut lock comprising a washer, a lug inwardly extended from said washer for engagement in a groove formed longitudinally in a bolt, said washer being cut away at its edge inwardly and circularly to form a tongue, said tongue being bent laterally, and a second washer adapted for loose engagement upon the bolt having an opening cut in the edge thereof to admit of the passage of the tongue therethrough at times to engage teeth formed upon the inner face of a nut on the bolt, said washer having a beveled edge at one side of the opening formed therein to effect the gradual withdrawal of the tongue.

In testimony whereof I affix my signature in presence of two witnesses.

ANTON NORDLUND. [L. S.]

Witnesses:
A. SODERSTROM,
E. B. HANSON.